United States Patent
Gerold et al.

(10) Patent No.: US 9,212,404 B2
(45) Date of Patent: Dec. 15, 2015

(54) PREPARATION METHOD FOR STAINLESS STEEL SLAGS AND STEELWORKS SLAGS FOR RECOVERY OF METAL

(75) Inventors: Carsten Gerold, Duesseldorf (DE); Frank Dardemann, Roetgen (DE); Joerg Langel, Cologne (DE); Holger Wulfert, Berlin (DE)

(73) Assignee: LOESCHE GmbH, Duesseldorf (DE)

( * ) Notice: Subject to any disclaimer, the term of this patent is extended or adjusted under 35 U.S.C. 154(b) by 433 days.

(21) Appl. No.: 13/582,966

(22) PCT Filed: Nov. 11, 2010

(86) PCT No.: PCT/EP2010/006879
§ 371 (c)(1),
(2), (4) Date: Sep. 5, 2012

(87) PCT Pub. No.: WO2011/107124
PCT Pub. Date: Sep. 9, 2011

(65) Prior Publication Data
US 2012/0325055 A1    Dec. 27, 2012

(30) Foreign Application Priority Data
Mar. 5, 2010    (DE) .......................... 10 2010 010 385

(51) Int. Cl.
*B02C 15/00*    (2006.01)
*C04B 5/00*    (2006.01)
(Continued)

(52) U.S. Cl.
CPC . *C21B 3/04* (2013.01); *B02C 15/00* (2013.01); *C04B 5/00* (2013.01); *C22B 7/005* (2013.01); *C22B 7/04* (2013.01); *Y02W 30/54* (2015.05); *Y02W 30/542* (2015.05)

(58) Field of Classification Search
CPC .......... B02C 15/00; C04B 5/00; C22B 7/005; C22B 7/04

USPC ................................. 75/749; 65/19; 241/24.1
See application file for complete search history.

(56) References Cited

U.S. PATENT DOCUMENTS 4,357,287 A * 11/1982 Schonert .......................... 264/39
4,747,547 A * 5/1988 Harada ............................ 241/19

(Continued)

FOREIGN PATENT DOCUMENTS

| CN | 101102848 A | 1/2008 |
| CN | 101152636 A | 4/2008 |

(Continued)

OTHER PUBLICATIONS

Machine translation of WO 2004-041450 published May 2004.*
(Continued)

*Primary Examiner* — George Wyszomierski
*Assistant Examiner* — Tima M McGuthry Banks
(74) *Attorney, Agent, or Firm* — Studebaker & Brackett PC (57) ABSTRACT

The invention relates to a preparation method for stainless steel slags and modified steelworks slags for recovery of metal. In order to create a dry preparation method which guarantees a low wear and energy efficient comminution and de-agglomeration of stainless steel slags and modified steelworks slags as well as a selective separation of a metal fraction and a silicate fraction and which can be variable in relation to the different slag compositions and different requirements upon the quality of the metal fraction and the at least one silicate fraction, a roller mill is used at least for the comminution. The slags are supplied with a feed grain size of up to approximately 150 mm. The use of an air swept roller mill is advantageous, in which the comminution and de-agglomeration, if necessary drying, and at the same time a separation into an extensively mineral-free metal fraction and a virtually metal-free silicate fraction are brought together. When using an overflow roller mill the separation of the metal fraction and the silicate fraction takes place in an external classifier.

20 Claims, 3 Drawing Sheets

(51) Int. Cl.
  *C22B 7/00* (2006.01)
  *C21B 3/04* (2006.01)
  *C22B 7/04* (2006.01)

(56) References Cited

U.S. PATENT DOCUMENTS

| | | | |
|---|---|---|---|
| 5,424,607 | A | 6/1995 | Jeong |
| 7,690,591 | B2 | 4/2010 | Baetz et al. |
| 2004/0182955 | A1 | 9/2004 | Kronz |
| 2005/0253002 | A1 | 11/2005 | Viljoen et al. |
| 2006/0049288 | A1 | 3/2006 | Kronz |
| 2008/0148902 | A1* | 6/2008 | Gillis et al. ............... 75/10.67 |
| 2008/0223967 | A1 | 9/2008 | Viljoen et al. |
| 2008/0296422 | A1 | 12/2008 | Batz et al. |
| 2010/0301145 | A1* | 12/2010 | Fard et al. ................ 241/17 |

FOREIGN PATENT DOCUMENTS

| | | |
|---|---|---|
| DE | 10 2004 005 535 A1 | 8/2004 |
| EP | 0 292 739 A2 | 11/1988 |
| EP | 0292739 A2 | 11/1988 |
| EP | 1554046 A1 | 7/2005 |
| EP | 1948360 B1 | 2/2009 |
| EP | 1554046 B1 | 12/2010 |
| JP | H05-38464 A | 2/1993 |
| JP | 05-245405 A | 9/1993 |
| JP | H5-245405 A | 9/1993 |
| JP | H06-19833 U | 3/1994 |
| JP | H06-210193 A | 8/1994 |
| JP | 2005-500160 A | 1/2005 |
| WO | 03/066220 A1 | 8/2003 |
| WO | WO 2004041450 A1 * | 5/2004 ............... B07B 1/00 |
| WO | 2007/022837 A1 | 3/2007 |
| WO | 2009/077425 A1 | 6/2009 |

OTHER PUBLICATIONS

Braniste, G. et al., "Treatment of steelmaking slags"; Metalurgia (Busharest) (1987), 39(12); pp. 595-598.

Kacklaender-Woywadt, C. et al., "The Loesche vertical roller mill for cement grinding"; Berg-und Huettenmaennische Monatshefte (2006), 151(6); pp. 243-247.

International Search Report; PCT/EP2010/006879; Apr. 26, 2011.

Translation of the International Preliminary Report on Patentability issued on Oct. 11, 2012 in corresponding International Application No. PCT/EP2010/006879.

English translation of an Office Action; "Notice of Allowance," issued by the Japanese Patent Office on Jun. 10, 2014, which corresponds to Japanese Patent Application No. 2012-556385 and is related to U.S. Appl. No. 13/582,966.

An Office Action issued by the Canadian Intellectual Property Office on May 21, 2014, which corresponds to Canadian Patent Application No. 2791123 and is related to U.S. Appl. No. 13/582,966.

H.U.Schaefer; "Loesche Vertical roller mills for the comminution of ores and minerals"; Minerals Engineering; pp. 1155-1160; vol. 14; No. 10; Elsevier Science Ltd; 2001.

* cited by examiner

PREPARATION METHOD FOR STAINLESS STEEL SLAGS AND STEELWORKS SLAGS FOR RECOVERY OF METAL

The invention relates to a preparation method for stainless steel slags and steelworks slags (BOP, electric arc furnace slags, etc.) or modified steelworks slags for the recovery of metal with simultaneous production of a silicate fraction as a product with a defined product grain size and defined properties.

Stainless steel slags are slags which arise as a by-product in the production of high-alloy steels. Stainless steel slags consist predominantly (approx. 80 to 90% by weight) of a silicate matrix, of which the main component is dicalcium silicate, and a metal portion which originates from steel and from the additional alloy elements such as chrome, nickel, manganese, molybdane, vanadium, etc., and is present as a pure metal in the form of granules or in the form of agglomerates, various alloys and oxides surrounded and enclosed by the silicate matrix. The metal content in the stainless steel slags varies in dependence upon the metallurgical process and the raw materials added and can be approx. 5 to 10% by weight. After pre-enrichment the metal content of such slags can be 20 to 30% by weight.

In steelworks slags, for example BOP (Basic Oxygen Process) and electric arc furnace slags, iron is present extensively in a chemically bonded form. In order to prepare and obtain the metal contents and a silicate fraction the steelworks slags are subjected before preparation chemically to a reductive treatment and are present as modified steelworks slags, in which the metal contents are present extensively metallically. The metal contents of such slags generally fluctuate between 10 and 30% by weight.

The metals lie in part freely, but predominantly as adhesions with the silicate matrix. In order to obtain the metals a breaking-down or preparation process is necessary. The preparation process comprises comminuting, sizing or screening and sorting processes.

An efficient recovery of the metals from stainless steel slags or modified steelworks slags for return to stainless steel production or steel production is also imperative having regard to the shortage of raw materials and the relatively high costs, for example for the alloy metals of the stainless steels. In addition an as far as possible unlimited use of the silicate fraction as a building material is to be possible.

Preparation methods are desirable with which a virtually silicate-free metal fraction and an extensively metal-free silicate fraction can be produced. The recycling of the constituent parts of the stainless steel slags or the modified steelworks slags is also desirable having regard to an otherwise necessary place on deposit of such slags which is associated with costs and can lead to environmental problems. In addition a silicate fraction with a defined product grain size and defined properties constitutes a marketable product.

A known preparation technology provides universally for wet processes for the crushing or grinding, sizing/screening and sorting stages (U.S. Pat. No. 5,427,607). The fine grinding of the pre-comminuted slag takes place in general in rod and ball mills. Sieves or hydrocyclones are provided for the sizing/screening and settling units, spiral separators or screw classifiers are used for density sorting. The wet preparation facilitates metal recovery of approximately 80% by weight.

Disadvantages of the known wet preparation are a necessary availability of water which is not on hand in all regions, and relatively high costs for water preparation and water circuits and in particular for the comminution to a grain size of for example <6 mm. A further disadvantage of the preparation with the aid of through wet methods is the elution of the heavy metals and the associated potential risk to the environment.

DE 10 2004 005 535 A1 discloses a preparation method with initially dry and subsequent wet comminution or reduction, sizing or screening and sorting stages. Raw slag is crushed to a product with a grain size of <20 mm with the aid of selective impact reduction, sieves, magnetic separators, eddy current and inductive separation as well as air settling and is then separated into a first grain fraction with a grain size of >2 mm and into a second grain fraction with a grain size of <2 mm. The first grain fraction is fed to a shaker unit and separated into a metal fraction, an intermediate product fraction and a grain mix fraction. The metal fraction constitutes the end product, the intermediate product is fed back to the comminution unit for the release of the metal and the grain mix is a marketable product for building works. The second grain fraction is fed to a fine material purification stage which consists of a concentration stage, a ball mill and two water removal worm elements.

Dry preparation works are also known, wherein the comminution, screening and sorting stages are carried out exclusively under dry conditions. Magnetic separators are used for sorting which exploit the magnetisability of the metal components of the slags as separation criterion. In addition dry density sorting processes, for example by means of air settling units, are known which are based upon the density difference between metal and silicatic matrix. Sensor sorting techniques are also known, wherein the metals are recognised by means of inductive sensors and are channelled out by means of compressed air (WP 2009/077425 A1).

In these purely dry processes a comminution of the raw slags in hammer mills or impact mills takes place which facilitate in principle a selective comminution of the slags. The relatively high speeds of the rotors of these mills are disadvantageous as well as the limited possibilities for adjustments. Besides a high specific wear there is a high proportion of finest grain, associated with a stressing and deformation of the metal particles, which can then also reach the fine and finest grain fraction. A reduction in the impact energy leads on the other hand to an insufficient mechanical breaking-down of the slags so that the metal particles are not completely released or disengaged. As the whole product is only screened and sorted after the comminution process, not insignificant metal portions are discharged with the silicatic fraction. This is associated with a deterioration in the quality of the silicatic fraction and correspondingly a reduced yield of the metals in the metal fraction. This can only be countered by a costly subsequent sorting of the fine and finest fraction.

It is an object of the invention to create a universally dry preparation method for metal recovery from stainless steel slags and modified steelworks slags which guarantees low wear and energy efficient comminution of the silicatic matrix with breaking-down or release of the metal particles and a selective separation of the metal particles or the metal portion and the silicate portion of the stainless steel slags or modified steelworks slags and which can be adapted to different initial slag compositions and different requirements in relation to quality of the metal fraction and the silicate fraction.

According to the invention the object is achieved through a method according to claim 1. Useful and advantageous embodiments are features of the sub-claims and described in the description of the drawings.

An essential part of the inventive preparation method is a selective comminution of the stainless steel slags or the modified steelworks slags, wherein the silicatic fraction is comminuted while the metal fraction is broken down or released through the mechanical stress and thus purified of silicatic adhesions. The original grain size and particle form of the metal fraction is essentially maintained.

The invention is based upon the fundamental idea of using roller mills for an exclusively dry preparation process for stainless steel slags and also for modified steelworks slags. Roller mills comprise a grinding track for a grinding bed to be formed thereon and grinding rollers rolling on the grinding bed. According to the invention stainless steel slag or modified steelworks slag is fed with a feed granularity size up to maximum 150 mm to a roller mill where it is grinded and de-agglomerated.

In this connection roller mills are understood to be preferably roller mills of the LOESCHE type but also ball ring mills, spring roller mills, roller pan mills, pan grinders and rolling mills such as pendulum roller mills which comprise a horizontal, inclined or also depression-form grinding track and conical or cylindrical or spherical grinding rollers. The grinding rollers are pressed by means of their own weight, spring systems or by means of hydraulic or hydraulic-pneumatic working cylinders with progressive adjustment possibility elastically onto the grinding bed so that an advantageous comminution takes place in the material bed.

The use of a LOESCHE roller mill with a horizontal grinding plate and with conical grinding rollers rolling on a grinding track of the grinding plate, the shell surfaces of which conical grinding rollers extend virtually parallel to the grinding track, is particularly suitable for the inventive dry preparation method, as both a pressure comminution with shear portion and also a pure pressure comminution can be applied, which can be adjusted via the grinding roller axis position to the rotation point of the grinding plate.

It has been found that an effective comminution and de-agglomeration of the supplied stainless steel slag or the modified steelworks slag is achieved with separation of the metal fraction from the silicate fraction if a pressure comminution with shear portion is carried out. The conical rollers are then arranged inclined at 15° relative to the horizontal grinding track and the grinding roller axes intersect the grinding plate axis above the grinding track plane.

In principle roller mills of different sizes can be used which differ in relation to the diameter of the grinding plate or the grinding pan and size and number of the grinding rollers. Roller mills with 2, 3, 4, 5 or 6 grinding rollers can thus be used. The number of grinding rollers can also be higher with increasing mill size.

It has been found that a selective comminution of the supplied stainless steel slag or the modified steelworks slag is achieved in a roller mill through compressive stress and a constructively variable shear portion or also solely through compressive stress and that after the grinding metal particles and silicatic particles lie free and can be separated from each other.

Upon use of a roller mill-classifier combination a separation of the silicate fraction from the metal fraction can be carried out directly after the comminution of the silicatic matrix and the breaking-down or releasing of the metal particles.

In principle the inventive preparation method can be carried out in roller mills which are operated according to the air flow mode or according to the so-called overflow mode. Roller mills in the air flow mode comprise a classifier which is placed on the roller mill or integrated into the roller mill. The sorting or separation of the comminuted, broken down and de-agglomerated slag into a metallic and silicatic fraction takes place within the air swept roller mill.

In a roller mill according to the overflow mode which is also described as an overflow mill, the reduced material passes via the grinding plate edge or retention rim downwards and is discharged from the mill. The separation of the metal fraction from the silicatic fraction takes place in external sizing, screening or classifying devices. Further details concerning roller mills in the air flow mode or overflow mode are explained in association with FIGS. 2 and 3.

The sorting and/or separation into a metal and a silicatic fraction takes place on the basis of the different raw densities of the two fractions. Due to the selective comminution within a roller mill and due to the differences in the raw density with comparable particle form, the air classification actually used for a flow screening can be used for sorting corresponding to the density.

It has surprisingly been ascertained that in the grinding process on the grinding plate or on the grinding track a grinding bed with a layering comparable with a layering according to the density of the fractions is formed. The metal particles of the metal fraction which are extensively not comminuted are present predominantly in a spherical form. Planar or columnar metal particles can also arise. The metal particles are enriched on the grinding track and form a lower layer while the lighter silicate particles are deposited on the metal particle layer.

Upon use of the roller mill in the air flow mode, that is to say in an air swept roller mill, preferably of the LOESCHE type, predominantly the silicate particles are picked up both by the inner air or gas circulation and by the outer air or gas flow, which is fed via a gas or air guide device to the grinding area and arrives extensively close to the housing at the classifier, if they overflow, together with the metal particles of the metal fraction, on the edge or retention rim of the grinding plate or a grinding pan.

The separation of the metal and silicate particles takes place after passing the grinding plate edge or grinding pan edge or the retention rim on the basis of the high density difference. The silicatic fraction with lower raw density is transported to the classifier with the rising air flow.

Particles rejected by the classifier can be silicatic particles which are too coarse or silicate particles still conveying metal which have not been fully broken down. It has been ascertained in experiments that after putting out of action an air swept roller mill a virtually pure and thus low-silicate metal fraction is present on the grinding plate. During the grinding process, however, this metal fraction does not remain on the grinding plate but is displaced by the subsequent flow of feed material. Accordingly the feed quantity into the mill and hence the throughput is a parameter for influencing the dwell time and hence the intensity of the mechanical stress of the metal particles. It has been ascertained that the degree of breaking-down of the metal particles can be increased through a longer dwell time in the grinding bed or on the grinding plate.

The metal particles flow continuously over the retention rim of the grinding plate or the grinding plate edge and are discharged.

The inventive layering or stratification on the grinding track or the grinding plate comparable with a layering according to density is determined, besides the formation of the grinding track, for example as a plane or with an inclination in relation to the centre of the mill, by the grinding pan speed, the contact pressure of the grinding rollers, the air quantity and the height of the retention ring. In principle the retention ring which is arranged around the grinding track edge is to prevent too rapid flowing away of the grinding material. It is advantageous that the height of the retention ring can be changed and an adaptation to different compositions of stainless steel slags or modified steelworks slags and to the purity of the desired silicate and metal fractions is guaranteed. Besides the height the outer contour or the cross-section of the retention ring can be formed differently in that for example one moves away from a constant thickness of the retention ring and the retention ring is provided with an inclined inner wall so that it has a thicker lower area and a narrower upper area. By raising the retention rim a higher grinding bed is formed on the grinding plate which predominantly consists of the metal fraction. In principle a roller mill can also be used with a grinding pan or a grinding plate without a retention rim.

It is particularly advantageous that the width and the geometry of the grinding rollers can also be varied in a roller mill in dependence upon the composition of the stainless steel slag or the modified steelworks slag supplied in order to be able to increase or reduce the grinding pressure incorporated into the grinding bed.

It is further advantageous if the grinding pressure and hence the degree of mechanical stress of the stainless steel slag or the modified steelworks slag can be progressively adjusted and hence the product quality of the metal fraction and silicatic fraction can be optimised with stainless steel slags or modified steelworks slags with different compositions.

In a LOESCHE grinding mill to be preferably used it is possible, together with the comminution of the stainless steel slag or modified steelworks slag and the release of the metal particles, a drying can be carried out if hot gas, for example hot air, is fed via a gas or air guide device to the grinding area or, if using an overflow mill, to the external classifying stages. The drying of the feed material increases the classifier efficiency. An agglomeration of metal and silicate particles through moisture is thus extensively avoided. In addition a dry product can be handled in silos. Furthermore, in case of a subsequent use of the silicate fraction, for example as additive material for the production of road asphalt, a separate drying stage is avoided.

It is advantageous that the silicate fraction and also the metal fraction can be subjected to a further classing after their discharge from the roller mill or an air swept or overflow roller mill. Consideration is thus given to the fact that the metal distribution in the fractions varies, in particular with the supply of different stainless steel slags or modified steelworks slags. For example at least one screen can be arranged downstream of the mill discharge as a classing or screening device in order to produce different products and product qualities.

It has been shown that in the preparation of stainless steel slags or modified steelworks slags in a roller mill of the LOESCHE type the metal particles are stressed very sparingly through the selective comminution and that they retain, after breaking-down, virtually their original, mostly spherical form and are not deformed. This is guaranteed among other things through an adjustable and controllable grinding pressure. Insofar as the metal particles exist predominantly in a spherical form and are not deformed the comminution or the breaking-down is associated with a lower energy consumption and additionally with lower wear of the grinding components and in particular with better flow behaviour on the grinding plate and over the retention rim. The retained and non-deformed form of the metal particles also has an advantageous effect upon the subsequent recycling in the metallurgical process. In a roller mill of the LOESCHE type predominantly working pressures in the range of from 200 to 2000 kN/m² are realised in relation to the area of the average roller diameter projected perpendicularly onto the grinding pan. It is advantageous that the contact pressure of the grinding rollers and hence the grinding force can be progressively set and can be adjusted in dependence upon the supplied stainless steel slag or modified steelworks slag and the desired quality of the metal fraction and silicate fraction.

Experiments have shown that the increasing of the working pressure leads to greater purity of the metal fraction. If, however, a critical pressure is exceeded undesirable deformations of the metal particles arise.

The classifier which can be integrated into the roller mill and arranged above the grinding area or for a "down" classifying also below the grinding plate edge and the annular chamber in a lower area of the grinding pan (EP 1 948 360 B1) can advantageously be a dynamic rod basket classifier, for example a LOESCHE rod basket classifier of the type LSKS or LDC (Loesche Dynamic Classifier), which can produce grain distributions with narrow as well as with spread bandwidth. Alternatively one or more classifiers can also be arranged outside of the roller mill. The classifier rotor speed and the volume flow of the gas-slag flow determine the desired separating grain diameter of the individual classifiers which can advantageously be set within wide boundaries.

It is advantageous that by arranging classifiers one after the other different silicatic products can be produced, for example fine fractions with metallic portions with a grain size of <0.500 mm or silicate fractions of different fineness. For such a multi-stage classifying both static and also dynamic classifiers can be used.

Alternatively to an air swept roller mill with integrated classifier a roller mill can also be operated with external classifying. No material transport then takes place within the roller mill to the classifier but instead the grinding material to be screened or sorted is fed after overflow from the grinding plate or from the grinding pan with mechanical conveyor units to one or more dynamic and/or static classifiers. A multi-stage classifying of the metal and silicate fractions discharged together has the advantages described above.

It has been ascertained that the slag coarse particles rejected by the classifier rotor also contain "adhered material" which is fed via a coarse particles cone of the classifier back to the grinding plate for further grinding. Obviously the grinding process in an air swept roller mill prevents overgrinding of the slag particles insofar as screening or classifying takes place directly after each comminution or de-agglomeration process. At the same time the classification process prevents feed material that has not yet been comminuted or sufficiently broken down from being discharged.

The advantages of the use of a roller mill, in particular an air swept roller mill of the LOESCHE type, can be seen in that several process stages can be brought together and carried out virtually simultaneously. These are the comminution, de-agglomeration, drying and classifying, including the transportation. Further advantages are the energy efficiency and a low wear and the possibility of being able to produce in one assembly both a recyclable metal fraction and also a further usable silicate fraction. The silicate fraction thereby also constitutes, due to its defined product grain size and purity, a high quality product which can be used for example in the building materials industry.

An essential feature of the inventive comminution or milling of stainless steel slags and modified steelworks slags in a roller mill is not only a dry process for the preparation of stainless steel slags and steelworks slags but also a drying process. As a result of the dry process the water circuits and drainage structure known from the conventional wet slag preparation are not necessary. As a result an eluation of the heavy metals or other harmful substances contained in slags does not therefore arise, as can be in the case with wet grinding. At the same time an expressive water preparation and the treatment of the solids separated therefrom including disposal are not necessary and water saving is achieved in principle. Essential in the inventive comminution are the significant decrease in the necessary comminution energy and the retaining of the form of the metal particles, for example stainless steel particles, in comparison with the methods known thus far. Insofar as the preparation technology is limited to one unit a simplified process and all in all a reduction in wear and, due to the lower energy consumption, a reduction in the total energy consumption are achieved. An online control of the working pressure of the grinding rollers and hence the grinding forces can in addition be applied particularly advantageously, whereby a controllable and constant quality of the separated metal and silicate fraction is guaranteed. In particular a change in composition of the slags to be prepared can be accommodated. In addition fluctuations in the product quality of the metal and silicate fraction are extensively avoided.

The inherent constructive and variable influencing values of a LOESCHE roller mill—mill type or mill size, classifier type(s), modules, retention rim, grinding roller form, grinding pressure, rotation speed, grinding pan, feed quantity, classifier rotation speed, gas volume flow, gas temperature—can be exploited. The rotation speed of the grinding plate or the grinding pan thereby influences the throughput of the roller mill and hence the degree of breaking-down and the product quality. By varying the feed quantity the product quality can also be influenced. A reduction in the feed quantity leads to a longer dwell time on the grinding pan and hence to more intensive stressing hand in hand with an increased degree of breaking-down and vice versa. The air or gas volume flow in the mill which can be progressively adjusted via a speed-controlled fan determines the discharge of the metal fraction as the heavy fraction and the classifying of the lighter silicate fraction. In case of the supply of moist stainless steel slags or moist modified steelworks slags a hot gas generator can be used and a grinding drying process can be carried out.

The invention is explained in greater detail below by reference to drawings and trials carried out. The drawings show.

Figure 1:
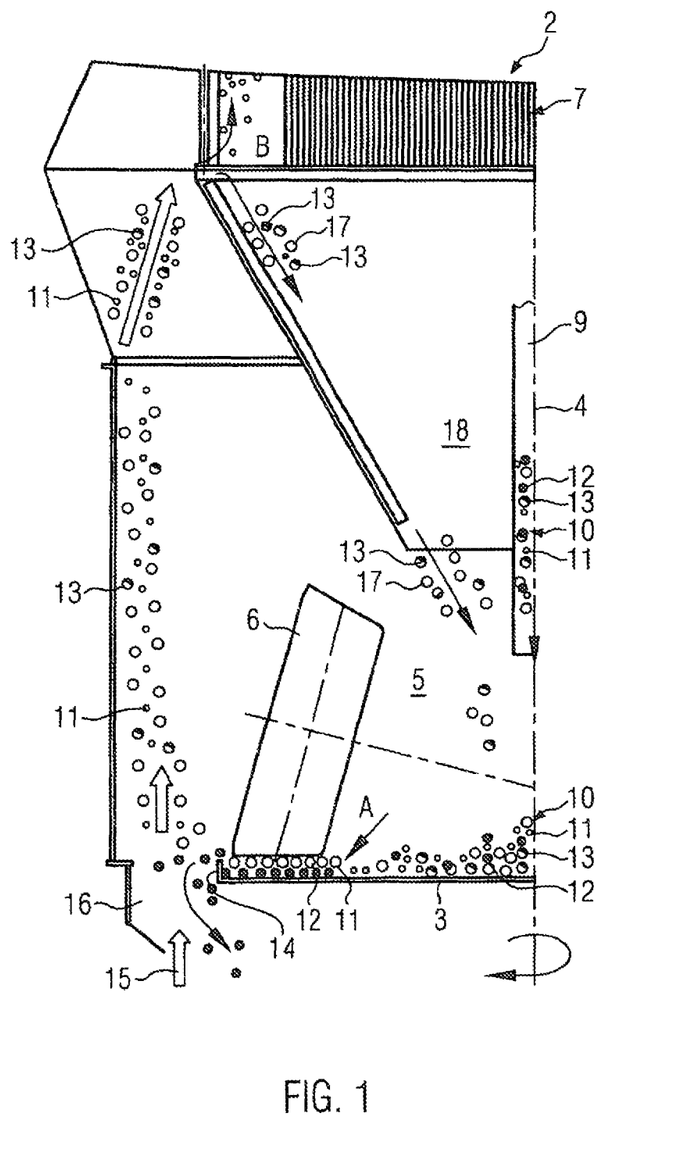
FIG. 1 a schematised cut-out of an air swept roller mill of the LOESCHE type for the inventive preparation of stainless steel slags and modified steelworks slags with a layering on the grinding pan comparable with a layering according to density.

FIG. 1 shows in a cut-out an air swept roller mill 2 of the LOESCHE type with a horizontally arranged planar grinding plate 3 which rotates about a vertical mill axis 4 in a grinding area 5 and on which grinding rollers 6 roll. A classifier 7 is integrated into the air swept roller mill 2, which classifier 7 is arranged above the grinding area 5. In this example it is a caged-rotor classifier.

The air swept roller mill 2 is supplied via a central feed 9 (alternatively also via a lateral feed, not shown) with stainless steel slag or modified steelworks slag as feed material 10 with a feed grain size of preferably <150 mm which consists predominantly of a silicate fraction 11, a metal fraction 12 or metal particles in the form of metal balls or granules and of adhesions 13 of metal and a silicate matrix.

The feed material 10 moves on the grinding plate 3 as a result of the centrifugal forces to the grinding plate edge and thereby passes below the hydro-pneumatically suspended grinding rollers 6, of which merely one grinding roller is shown in FIG. 1.

Due to the density difference between the silicate fraction 11 and the metal fraction 12 a density layering forms on the grinding plate 3 which comprises a lower layer consisting of the particles of the metal fraction 12 broken down in the grinding process and an upper layer consisting of the lighter particles of the silicate fraction 11. Arrow A is intended to show that due to the centrifugal force effect from the rotation of the grinding plate 3 both the lower metal fraction 12 and the silicate fraction 11 lying above move over a retention rim 14 on the periphery of the grinding plate 3 and come within the influence of an upwardly orientated gas flow. The lighter silicate fraction 11 is thereby carried along by the rising gas flow 15 which passes via an annular channel 16 with louvre ring (not shown) as a gas and air guide device into the grinding area 5. With the gas flow 15 not only the particles of the silicate fraction 11 represented as hollow particles but also adhesions 13, that is to say silicate particles with metal portions, are fed to the classifier 7. A separation of the fine portion of the silicate fraction 11 takes place in the classifier 7 and this is carried upwards (see arrow B) via a fine material discharge (not shown). Coarse particles 17 of the silicate fraction 11 and adhesions 13 as well as fine particles 19 of the metal fraction 12 are rejected in the classifier 7 and fall through a oversize material cone 18 back onto the grinding plate 3.

The metal particles of the metal fraction 12 broken down in the grinding process do not remain on the grinding plate 3 but are instead also moved outwards over the retention rim 14. Due to their higher density the metal particles of the metal fraction 12 pass under the effect of gravity into the annular channel 16 and via a discharge (not shown) out of the mill.

Figure 2:
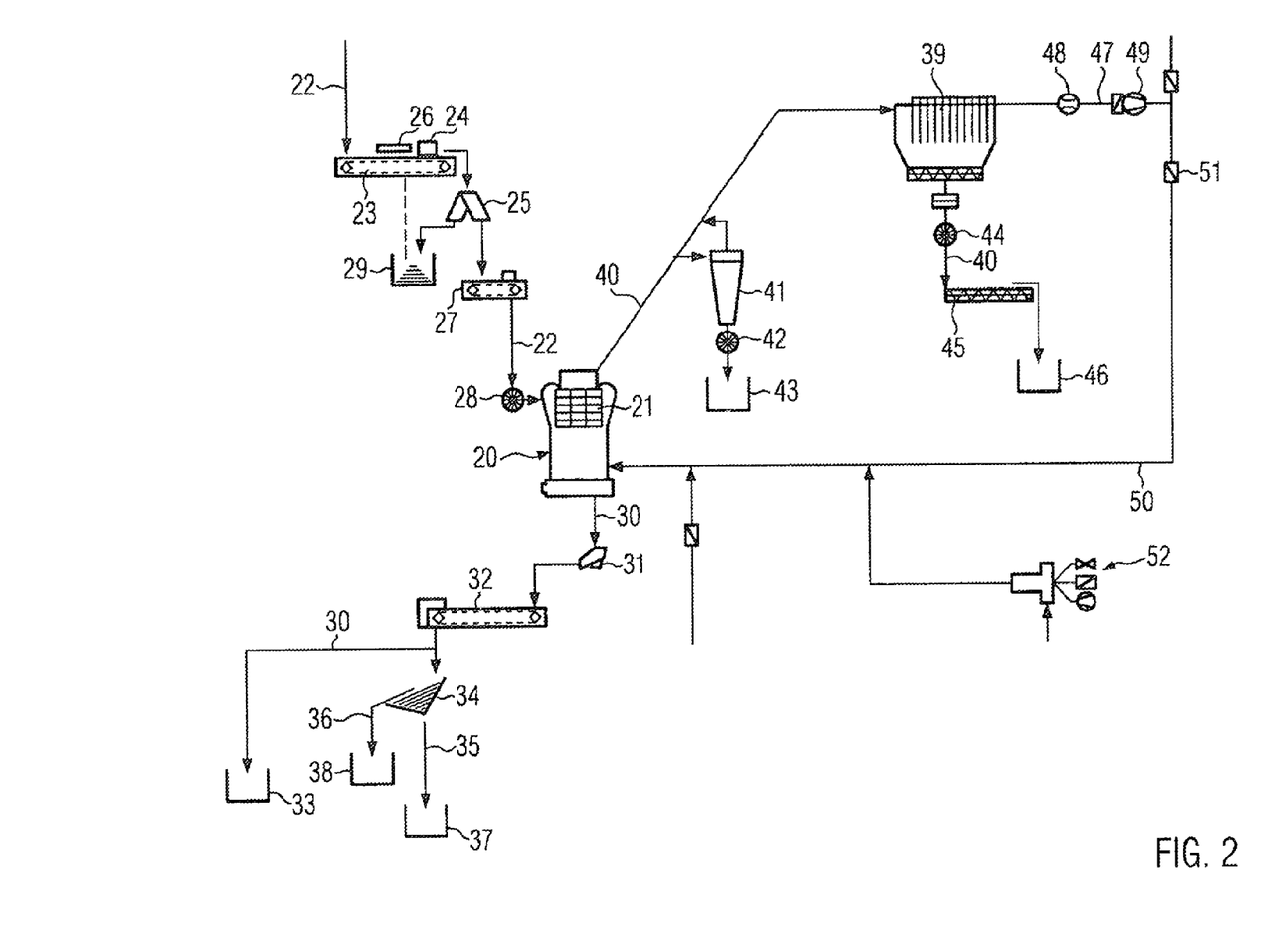
FIG. 2 a plant schema with an air swept roller mill of the LOESCHE type according to FIG. 1 for carrying out the inventive preparation method and FIG. 3 a plant schema with a roller mill of the LOESCHE type in the overflow mode for carrying out the inventive preparation method.

The plant schema of FIG. 2 shows an example of a typical installation structure with a LOESCHE roller mill 20 in the air flow mode with placed-on or integrated classifier 21. This roller mill is also indicated as air swept roller mill. As feed material 22 stainless steel slag or also modified steelworks slag reaches a conveyor unit 23. Above the conveyor unit 23 a metal detector 24 is installed in order to remove larger metal pieces from the feed material before it is fed into the roller mill 20. The detected materials are fed via a breeches chute 25 to a silo 29.

Optionally a magnetic separator 26, e.g. an over belt magnetic separator, can be provided above the conveyor unit 23.

The feed material 22 passes via a dosing belt 27 into the roller mill 20. The exclusion of air from the roller mill 20 is ensured for example by a bucket wheel lock as a mechanical air seal 28 in a feed chute. The grinding and de-agglomeration of the feed material and simultaneously the classifying or separation into a metal fraction and silicate fraction take place in the air swept roller mill 20. Only one device is therefore necessary for the grinding, de-agglomeration and classifying or separation.

The particles of the metal fraction 30 transported over the retention rim of the grinding plate (see also FIG. 1) pass via a discharge element 31 and a conveyor belt 32 into a metal fraction silo 33. If necessary, a sizing or screening aggregate 34 or a plurality of sizing aggregates (not shown) can optionally be intermediately positioned in this material flow in order to obtain specified metal fractions separately, for example a finer metal fraction 35 and a coarser metal fraction 36, which then pass after sizing/screening into a corresponding silo 37, 38.

The silicate fraction 40 or the dust-form silicate matrix leaves the classifier 21 and is separated in a subsequent filter 39. Optionally a combination of a cyclone 41 or a cyclone battery and a filter 39 can be provided. The cyclone 41 has the function of separating any metal particles 42 still contained in the silicatic matrix 40 with the coarse material which are then channelled out into a silo 43. Dust is then removed from the fine material from the cyclone 41 or a cyclone battery in the filter 39.

The material flows of the dust-form silicate matrix 40 after the filter 39 pass via a discharge element 44 and a product conveying device 45 into a corresponding product silo 46.

The process gas flow 47 existing after the filter 39 passes a volumetric flow meter 48 and reaches a mill ventilator 49 which is generally equipped with a speed-controlled drive.

A large part of the process gas 47 is fed back to the air swept roller mill 20 via a recirculation gas line 50 with recirculation gas damper 51 for use of its heat content. The remaining part of the process gas 47 leaves the plant via a stack (not shown).

If the moisture of the feed material to be ground necessitates this, additional heat can be provided with the aid of a hot gas generator 52. The hot gas is fed into the recirculation gas line 50 and mixed with the recirculated process gas and fed to the air swept roller mill 20.

Figure 3:
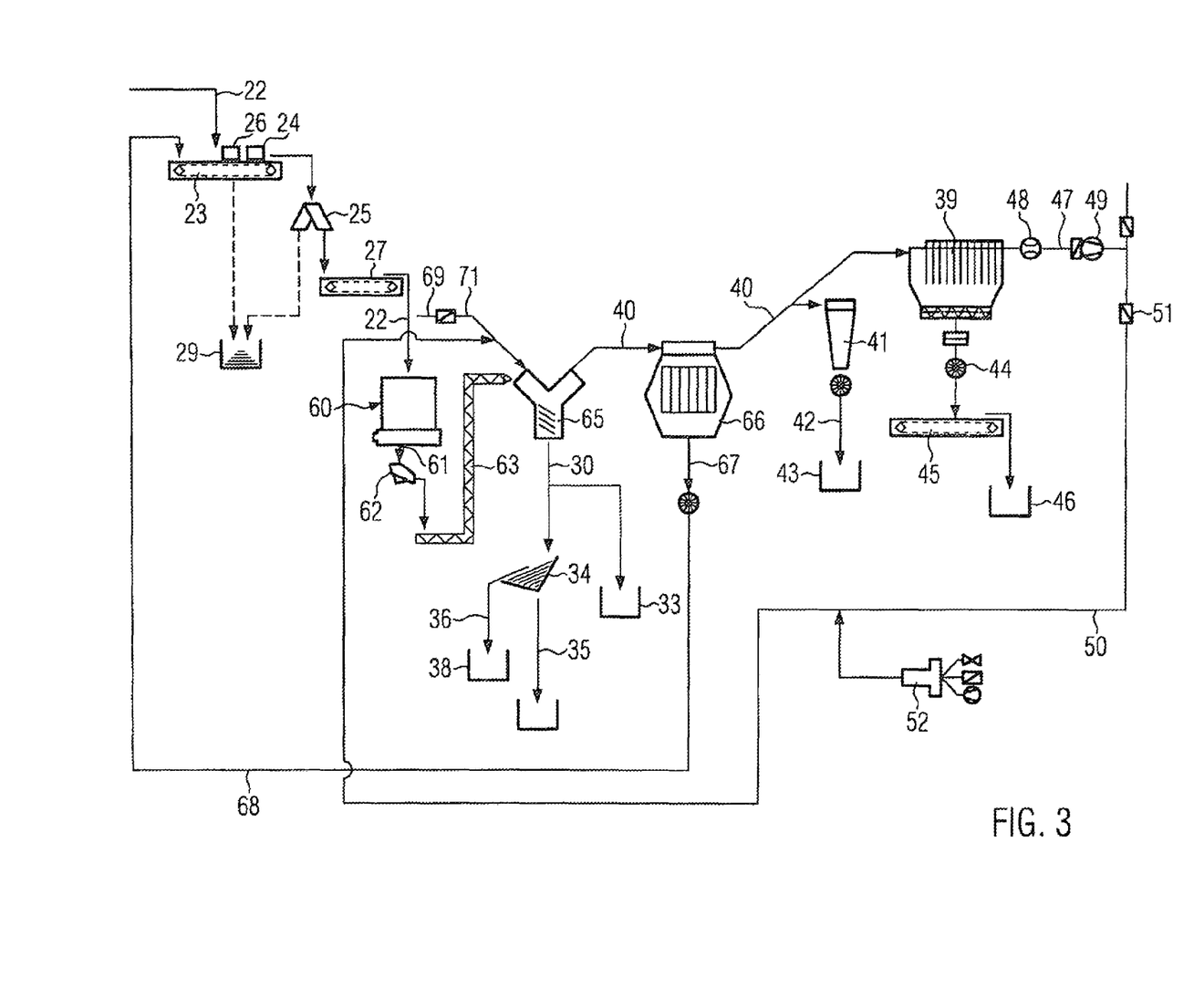

A plant schema in its principal structure for the implementation of the inventive preparation method using a LOESCHE roller mill in the so-called overflow mode as a variant of the LOESCHE grinding technology is shown in FIG. 3.

The supply of the feed material 22 takes place extensively as in the plant according to FIG. 2. Identical reference numerals are used for identical features.

Stainless steel slag or modified steelworks slag to be prepared is fed as feed material 22 to a conveyor unit 23. A metal detector 24 is installed above the conveyor belt 23 in order to remove larger metal pieces from the feed material 22 before feeding into a roller mill 60 in the overflow mode. A magnetic separator 26, e.g. an over belt magnetic separator, can optionally be provided above the conveyor belt 23 insofar as this is required by the method. The detected or separated materials pass via a breeches chute 25 into a silo 29 for foreign materials. The feed material 22 passes via a dosing belt 27 into the overflow roller mill 60.

In the overflow roller mill 60 a dry comminution of the feed material 22 takes place. The whole comminuted and de-agglomerated grinding material 61 is transported over a grinding plate edge or retention rim of the grinding plate or a grinding pan and discharged via a lower mill discharge. It passes via a discharge element 62 and a conveyor device 63 to a classifier 65 which in this embodiment is a static classifier. The metal fraction 30 is separated from the silicate fraction 40 in the static classifier 65.

The separated metal fraction 30 is taken up by a silo 33. If this is regarded as necessary, a screen or a plurality of screening aggregate 34 can optionally be arranged in the material flow of the metal fraction 30 in order to produce a plurality of metal fractions 35, 36 which are fed to a respective silo 37, 38.

A material flow consisting essentially of the silicate fraction 40 leaves the static classifier 65, which material flow is fed to a further classifier, for example a dynamic classifier 66. In this dynamic classifier 66 particles of the silicate fraction 40 which have not yet been adequately ground are separated as coarse grain 67 and fed via a coarse grain return line 68 back to the feed material 22 and thus the overflow mill 60.

The dust-form silicate fraction 40 leaves the dynamic classifier 66 and is separated in a subsequent filter 39 or optionally in a combination of a cyclone 41 or a cyclone battery and a filter 39. In the cyclone 41 any metal particles 42 still contained in the silicatic fraction 40 are separated and fed to a silo 43.

The products from the silicate fraction 40 pass after the filter 39 via a discharge element 44 and a product conveyor device 45 into a silo 46.

The path of the process gas 47 is similar to the variant with a roller mill in the air flow mode of FIG. 2. The filter 39 is followed by a volumetric flow meter 48 and a mill fan 49 with a speed-controlled drive. A part of the process gas 47 leaves the plant via a flue (not shown). By means of a recirculation gas line 50 and a control damper 51 arranged therein process gas 47 is fed to an inlet of the static classifier 65. In case of increased material moisture a hot gas generator 52 is connected. Fresh air 69 as process air is drawn via a nozzle 71 with damper 72 into the static classifier 65.

Tests were carried out on a technical scale.

The object of the experiments carried out in a laboratory mill of LOESCHE GmbH consisted initially in demonstrating the general suitability of a roller mill of the LOESCHE type for the preparation of stainless steel slags or steelworks slags for recovery of metal.

After the general suitability had been ascertained the process parameters of the roller mill were set so that an increased metal content in the stainless steel fraction was achieved with a simultaneous reduction of the metal content in the silicatic fraction.

A stainless steel slag was used for the tests which was a pre-enriched stainless steel slag. This means that the stainless steel portion was enriched by means of a sorting process from approx. 5 to 25-35% by weight metal.

The feed grain size was 0 to 4 mm, the feed moisture was 8 to 15% by weight and the metal content in the feed material was 25 to 35% by weight.

The grinding trials for the inventive preparation of the stainless steel slag were carried out corresponding to the plant schema of FIG. 2. The following process parameters and constructive parameters were relevant for the setting of the laboratory mill and were varied in part during the trials in the bandwidth set out below:

| | |
|---|---|
| 1. Working pressure: | From 200 to 2000 N/m$^2$ (having regard to the area of the average roller diameter projected perpendicularly onto the grinding pan) |
| 2. Grinding pan speed: | Was not varied |
| 3. Classifier speed | From 600 to 20 U/min$^{-1}$ |
| 4. Process gas volume flow | 1000-2200 m$^3$/h (operating state) |
| 5. Temperature after mill | Constant (approx. 90° C.) |
| 6. Retention rim height | 4-20 mm |

The following trial results were obtained:
Product Grain Sizes:

| | |
|---|---|
| 1. Metal fraction | 0-4 mm |
| 2. Silicate fraction | 5-50% by weight residue in relation to 63 μm |

TABLE 1

Trial results—Metal yield and contents

| | | Trial 1 | Trial 2 | Trial 3 | Trial 4 | Trial 5 | Trial 6 |
|---|---|---|---|---|---|---|---|
| Metal content in the feed material (previously enriched stainless steel slag) | Weight (%) | 30.16 | 35.67 | 37.68 | 39.44 | 31.61 | 32.56 |

TABLE 1-continued

Trial results—Metal yield and contents

|  |  | Trial 1 | Trial 2 | Trial 3 | Trial 4 | Trial 5 | Trial 6 |
|---|---|---|---|---|---|---|---|
| Metal content in the metal fraction | Weight (%) | 76.85 | 84.21 | 90.33 | 87.49 | 57.85 | 56.84 |
| Metal content in the silicate fraction | Weight (%) | 2.10 | 3.10 | 2.60 | 2.30 | 0.50 | 0.30 |
| Metal yield (total) | Weight (%) | 90.60 | 91.77 | 94.53 | 95.38 | 98.39 | 97.56 |

It was found that the metal content of the metal fraction decreases with finer grains. Through a sizing or screening and thus separation of the fine fraction the metal content in the remaining coarse metal fraction can be significantly increased.

The silicate fraction which is discharged from the classifier still contains a certain metal portion. It was possible to improve the product purity of the silicate fraction through adjustment possibilities of the roller mill and in particular through the process gas volume flow and classifier parameters.

It was ascertained in the grinding trials that the optimal working pressure lies in the range of from 400 to 1200 kN/m² depending upon the slag sample, the degree of adhesions, the desired purity level of the metal and silicate fractions and the product grain size of the silicate fraction.

It was found that with a reduction in the throughput the purity increases in the metal fraction. Through a lower throughput the dwell time of the metal particles on the grinding pan or the grinding plate is lengthened. The mechanical stress is thus increased even with the working pressure remaining the same and thus remaining adhesions of silicatic matrix on the metal particle are removed.

It is advantageous that in dependence upon the desired product qualities the portion of the shear forces which are incorporated by the grinding parts or grinding tools into the grinding material can be adjusted and a pressure comminution with shear portion or a shear-free pressure comminution (see EP 1 554 046 A1) can be selected.

The invention claimed is:

1. Preparation method for stainless steel slags and steelworks slags for recovery of metal,
feeding the stainless steel slags or steelworks slags to a dry comminution, de-agglomeration, screening and sorting process producing a metal fraction and at least one silicate fraction, whereby the steelworks slags have previously been subjected to a reductive treatment and are fed as modified steelworks slags, wherein
a roller mill with a grinding track and grinding rollers rolling on a grinding bed is used for the comminution and de-agglomeration,
stainless steel slags or modified steelworks slags with a feed grain size of up to approximately 150 mm are fed to the roller mill, and
comminution and de-agglomeration are carried out in dependence upon a slag type, a metal content of the slag, a degree of adhesions and a desired purity level of the metal and silicate fractions, and a product grain size, with comminution and de-agglomeration being carried out at a working pressure in the range from 150 to 4500 kN/m² in relation to an area of an average roller diameter projected perpendicularly onto a grinding pan, while retaining of a form of metal particles.

2. Method according to claim 1, wherein
the roller mill is used in combination with a classifier to perform the comminution and de-agglomeration and, optionally, drying and separating into the metal fraction and silicate fraction.

3. Method according to claim 2, wherein
the roller mill operates in an air flow mode to be an air swept roller mill with an integrated classifier for the comminution, de-agglomeration, screening, sorting and drying, and
after an enrichment of free and broken down metal particles from the metal fraction on a grinding pan and transport via a grinding pan edge or a retention rim of the grinding pan, the metal fraction is continuously removed downwards and thus separated from the silicate fraction.

4. Method according to claim 3, wherein
said silicate fraction and metal particles, as well as adhered material, are transported pneumatically to the classifier, and
the classifier classifies the silicate fraction and metal particles into a first quantity of particles that are sufficiently reduced in size and a second quantity of coarser particles larger in size than those of the first quantity, the first quantity is discharged as fine material while the second quantity, as well as adhesions, are rejected by the classifier and fed back to a grinding plate for further comminution and de-agglomeration.

5. Method according to claim 1, wherein
a roller mill in an overflow mode with external screening and sorting is used for the comminution, de-agglomeration and screening, and
a mixture of free and broken down metal particles derived from the metal fraction and particles derived from the silicate fraction are transported via a grinding plate or grinding pan edge or a retention rim and fed using a conveyor device to a classifier or a classifier combination and separated into the metal fraction and silicate fraction.

6. Method according to claim 5, wherein
a grinding material comprising a mixture of free and adhered metal particles and particles of the silicate fraction discharged from an overflow mill is fed to a classifier, and
the silicate fraction is fed essentially metal free in a gas flow to a dynamic classifier for separation of a fine silicate fraction from coarse grain while the metal fraction is removed and optionally fed to a sorting/screening aggregate or to sorting/screening aggregates for separation of coarse metal particles from finer metal particles.

7. Method according to claim 4 or 6, wherein
a grain size of the silicate fraction is progressively adjusted and lies in the range of smaller than 5 mm and with a fineness of 3500 to 15000 Blaine.

8. Method according to claim 1, wherein
conically formed grinding rollers are used for the comminution and de-agglomeration, the conically formed grinding rollers being arranged with their roller shell parallel to the planar grinding track with the formation of a grinding gap and roll on the grinding bed.

9. Method according to claim 1, wherein
a grinding plate is used for the comminution and de-agglomeration with a retention rim with pre-definable height and cross-section profile.

10. Method according to claim 9, wherein
a grinding plate or a grinding pan is used for the comminution and de-agglomeration with a retention rim, the height of which lies in the range of 0 to 160 mm.

11. Method according to claim 1, wherein
for the comminution and de-agglomeration, a grinding bed is formed on the grinding track with a layering comparable with a layering according to density, wherein a lower layer is formed by extensively uncomminuted metal particles enriching on the grinding track and an upper layer is formed by lighter silicate particles.

12. Method according to claim 1, wherein
the metal fraction is removed via a retention rim and discharged in at least one reject discharge or by means of a discharge device from the roller mill operating in an air flow mode with integrated classifier, or the metal fraction is discharged from a classifier arranged downstream of the roller mill operating in an overflow mode and is subjected to a sorting/screening, and separated as a separate product or intermediate product.

13. Method according to claim 1, wherein
the roller mill operates in an air flow mode such that comminuting, de-agglomeration, screening or classifying, sorting and transportation, possibly also drying, are brought together, or the roller mill operates in an overflow mode such that comminution and de-agglomeration are carried out and screening or classifying, sorting and optionally drying are carried out externally and in this way high quality products of a defined grain size and purity are produced with an extensively silicate-free metal fraction and a virtually metal-free silicate fraction.

14. Method according to claim 1, wherein
the roller mill operates as an air swept roller mill depending upon mill size with two, three, four, five, six or more grinding rollers and with an integrated classifier, or the roller mill operates as an overflow mill depending upon mill size with two, three, four, five, six or more grinding rollers and an external classifying or sorting/screening device.

15. Method according to claim 1, wherein
metal content of the stainless steel slags or of the modified steelworks slags is between 2 and 30% by weight.

16. Method according to claim 1, wherein
a degree of breaking-down of the metal particles is adjusted via a dwell time of grinding material on the grinding bed and a level of mechanical stress, the degree being controlled via an adjustment of the working pressure, a feed quantity, a rotation speed of the grinding pan and retention rim height.

17. Method according to claim 1, wherein
a volume flow setting of the roller mill and a classifier setting of a classifier are used to determine discharge of the metal particles from the roller mill and classify the silicate fraction, respectively.

18. Method according to claim 1, wherein
a temperature of a hot gas flow, which is fed to the roller mill operating as an air swept roller mill or to a classifier arranged downstream of the roller mill operating as overflow roller mill, is adjusted in dependence upon an amount of moisture of supplied stainless steel slag or modified steelworks slag and/or a desired moisture of the silicate fraction.

19. Method according to claim 1, wherein
portions or a whole quantity of the coarse material particles rejected by a classifier are removed via an additional discharge element and fed to a further enrichment stage.

20. Method according to claim 1, wherein
in dependence upon a desired product qualities, a portion of shear forces which can be incorporated by grinding tools into grinding material is set, and a pressure comminution with shear portion or a shear-free pressure comminution is carried out.

* * * * *